(No Model.) 2 Sheets—Sheet 1.
A. T. KELLIHER.
HOISTING MACHINE.
No. 428,108. Patented May 20, 1890.
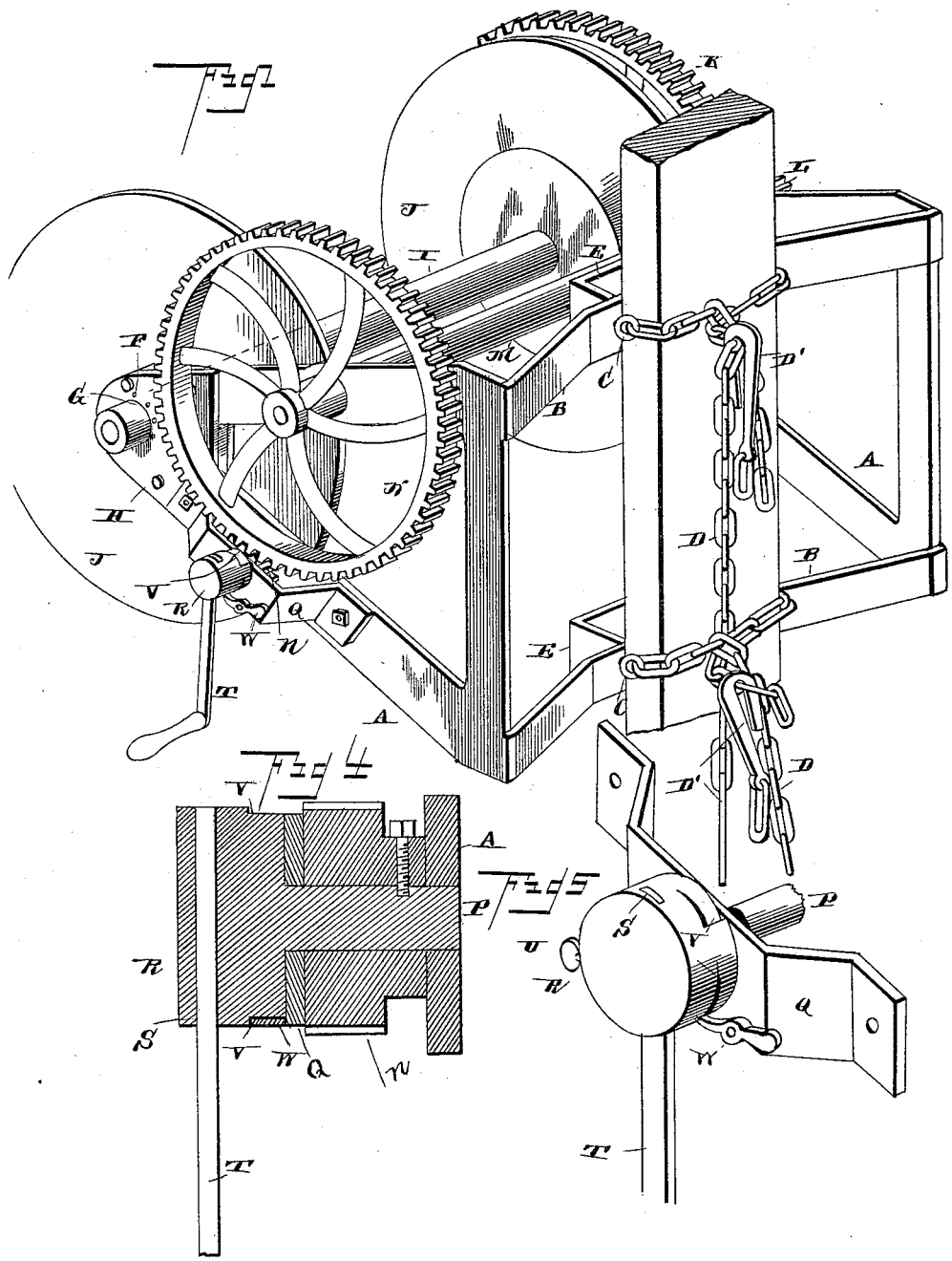

(No Model.) 2 Sheets—Sheet 2.
A. T. KELLIHER.
HOISTING MACHINE.
No. 428,108. Patented May 20, 1890.
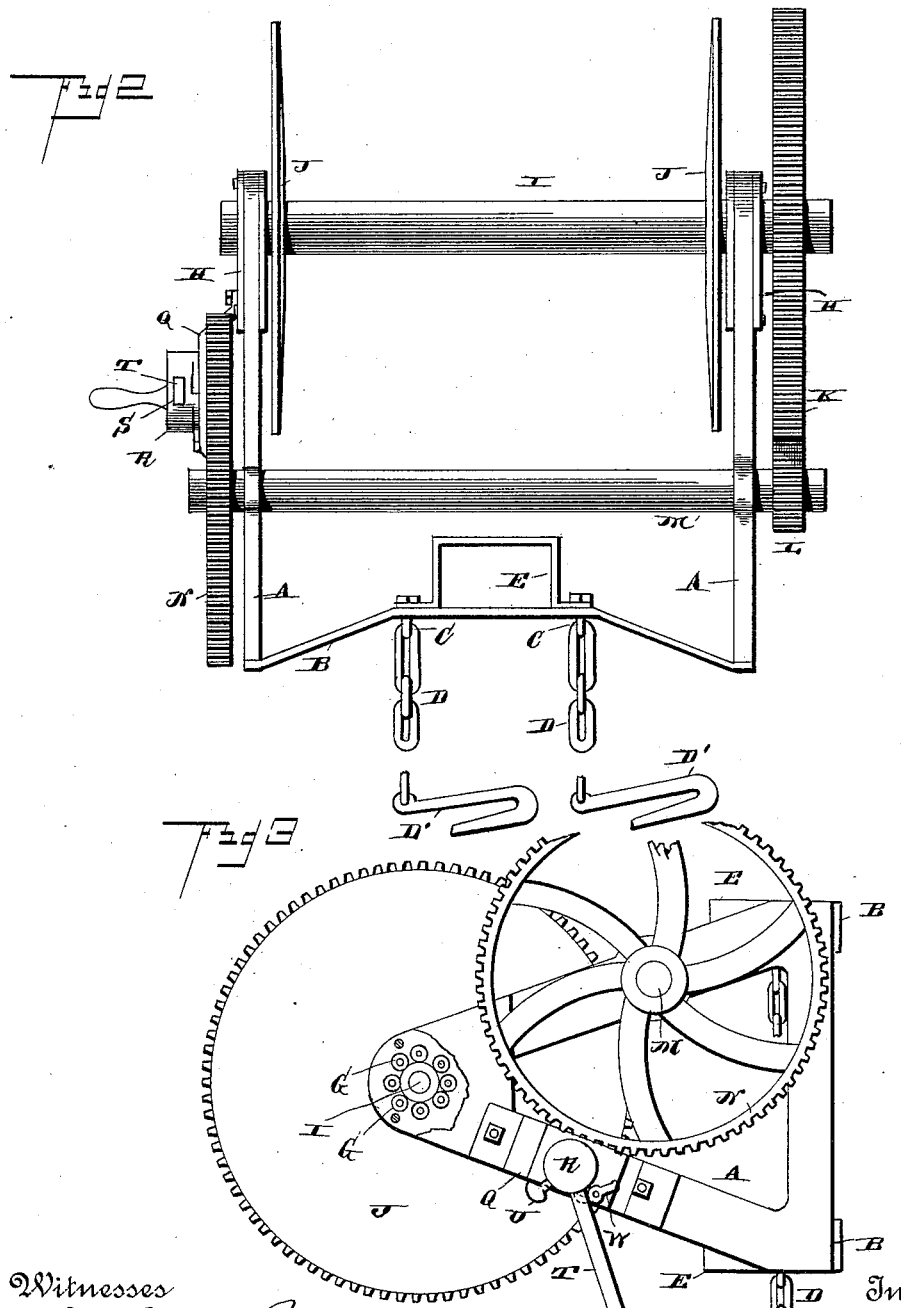
Witnesses
John Smirie
H. F. Riley
Inventor
Alfred T. Kelliher
By his Attorneys
C. A. Snow & Co.

UNITED STATES PATENT OFFICE.

ALFRED T. KELLIHER, OF BETHEL, MAINE.

HOISTING-MACHINE.

SPECIFICATION forming part of Letters Patent No. 428,108, dated May 20, 1890.

Application filed November 22, 1889. Serial No. 331,161. (No model.)

*To all whom it may concern:*

Be it known that I, ALFRED T. KELLIHER, a citizen of the United States, residing at Bethel, in the county of Oxford and State of Maine, have invented a new and useful Hoisting-Machine, of which the following is a specification.

My invention relates to improvements in hoisting-machines; and it consists in certain novel features hereinafter described and claimed.

In the drawings, Figure 1 is a perspective view of my improved machine in operative position. Fig. 2 is a plan view. Fig. 3 is an end view with a part broken away. Fig. 4 is a detail sectional view, and Fig. 5 is an enlarged detail perspective view of the crank and the pawl for preventing retrograde movement of the same.

The supporting-frame of my improved hoisting-machine consists of the side bars A A and the braces B, secured to and connecting the ends of the said side bars. The side bars are substantially triangular in form, and their central portions are open or hollow, so as to reduce their weight without affecting their strength, and the braces B are bowed, as shown in Fig. 2, so that they may pass around the supporting post or beam, and on the rear sides of the cross-bars I provide the rings or eyes C, to which the securing-chains D are attached. These chains D are provided at their ends with hooks D', which are engaged in the proper links of the chains, so as to bind the said chains around the beam and post and thereby secure the machine thereto. On the front side of the braces B, I provide the brackets or loops E, which are adapted to slip over a stake or anchor-post and support the machine in operative position. The rings or eyes C are provided by employing eyebolts, which are inserted through the braces and the ends of the loops or brackets, so as to secure the said brackets to the said braces.

In the front ends of the side bars A, I provide transverse openings F, and through these openings a series of anti-friction rollers G extend, the said rollers being journaled in the caps or plates H, which are secured to the ends of the side bars, as shown. The windlass-shaft I is inserted between and bears on the anti-friction rollers G, and the said shaft is provided, between the side bars, with the disks or guards J, between which the hoisting-rope is wound. The windlass has secured to one end a gear-wheel K, which meshes with a pinion L on the end of a transverse shaft M, which is journaled in the side bars, as clearly shown. The gear-wheel K and the pinion L are suitably secured to their respective shafts. The end of the transverse shaft M opposite the pinion L has a gear-wheel N, which meshes with a pinion $n$, secured on a stub-shaft P, journaled in the side bar A, and a cap Q, which is secured to the side bar and extends over the said pinion. The end of the said stub-shaft projects through the cap, and a crank-disk R is secured to the said end of the shaft by set-screws, as clearly shown. This crank-disk is provided with a diametrical slot S, through which a lever or crank-handle T is inserted, and this lever or crank-handle is adjustably secured in the said slot by a set-screw U, mounted in the crank-disk and bearing on the lever or handle. This crank-disk is further provided in its edge and near its inner side with the notches or recesses V, and these notches or recesses are engaged by the gravity-pawl W, which is pivoted on the cap Q, as shown.

The construction and arrangement of the several parts of my improved machine being thus made known, the operation and advantages of the same will, it is thought, be readily understood. The machine is secured to a supporting post or beam, as shown and described, and the hoisting-rope is secured to the windlass-shaft and also to the object to be raised or hauled over the ground, after which the lever or crank-handle is rotated, thereby imparting motion to the several parts of the machine, so as to wind the hoisting-rope on the windlass, and thereby draw upon the object attached to the said rope, as will be readily understood. The notches in the crank-disk slip readily under the pawl as the rope is being wound on the windlass, but will be engaged by the said pawl if the motion of the crank-handle ceases, so that retrograde movement of the windlass will be thereby prevented.

My improved machine is very simple in its construction and can be very easily set up in its operative position. The friction-rollers in the ends of the side bars enable the windlass-shaft to rotate very freely and easily. The cap over the driving-pinion effectually protects the same from injury. The construction of the crank-disk is such that it possesses a maximum degree of strength, and the lever or crank-handle can be easily adjusted so as to possess more or less leverage, and consequently vary the power of the machine, as will be readily understood.

The securing-chains and the brackets on the rear braces permit the machine to be readily and securely fastened to any tree, post, or beam, so that the machine may be readily adapted for use in various positions and places.

Having thus described my invention, what I claim, and desire to secure by Letters Patent, is—

1. In a hoisting-machine, the combination of the supporting-frame, the windlass therein, the stub-shaft on the side of the supporting-frame, gearing between said shaft and the windlass, the crank-disk secured to the stub-shaft and provided with notches in its periphery, the pawl engaging said notches, and the crank-handle adjustably secured to the crank-disk, as set forth.

2. The combination of the supporting-frame, the windlass therein, the stub-shaft on the side of the frame, the pinion on said shaft, gearing between said pinion and the windlass, the cap secured to the supporting-frame and passing over the pinion on the stub-shaft, the crank-disk secured to said shaft and provided with a series of notches in its periphery and having a diametrical slot, the crank-handle adjustably secured in said slot, and the pawl pivoted on the cap and engaging the notches, as set forth.

In testimony that I claim the foregoing as my own I have hereto affixed my signature in presence of two witnesses.

ALFRED T. KELLIHER.

Witnesses:
A. E. HERRICK,
ELLERY C. PARK.